J. W. HAWKINS.
STEAM PACKING FOR STEAM ENGINES AND PUMPS.

No. 188,798. Patented March 27, 1877.

WITNESSES;
David Bunn
John W. Seaver

INVENTOR;
John W. Hawkins.

UNITED STATES PATENT OFFICE.

JOHN W. HAWKINS, OF AKRON, OHIO.

IMPROVEMENT IN STEAM-PACKING FOR STEAM ENGINES AND PUMPS.

Specification forming part of Letters Patent No. 188,798, dated March 27, 1877; application filed February 9, 1877.

*To all whom it may concern:*

Be it known that I, J. W. HAWKINS, of Akron, in the county of Summit and State of Ohio, have invented certain new and useful Improvements in Steam-Packing for Steam Engines and Pumps; and I do hereby declare that the following is a full, clear, and exact description of the same, reference being had to the accompanying drawings, forming a part of this specification, and in which—

Figure 1:
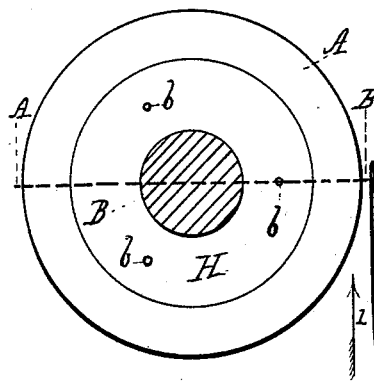
Figure 2:
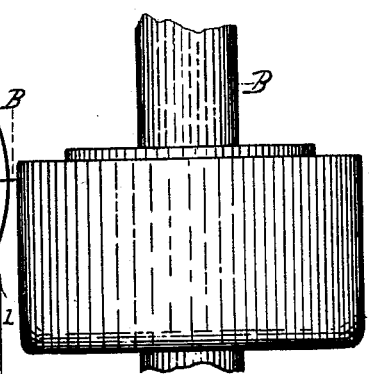
Figure 3:
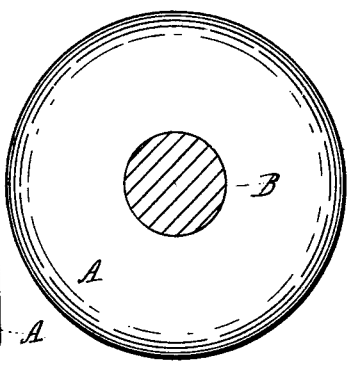
Figure 4:
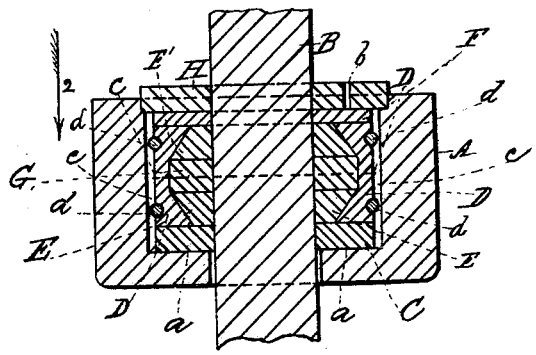
Figure 5:
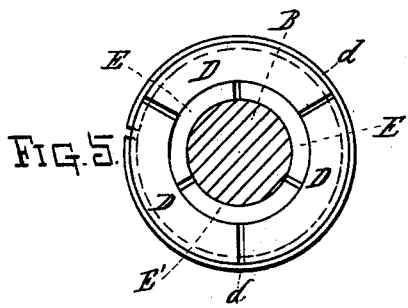
Figure 6:
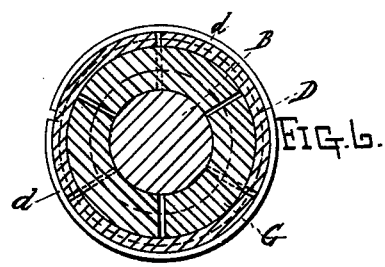

Figure 1 represents an inside view of my improved steam-packing, as will be hereafter explained. Fig. 2 represents a side view of the parts shown in Fig. 1. Fig. 3 represents an outside view, looking in the direction of arrow 1, Fig. 2. Fig. 4 represents a longitudinal central section on line A B, Fig. 1. Fig. 5 represents an end view of the packing removed from the cage or case; and Fig. 6 represents a central cross-section of the packing shown in Fig. 5, indicated by the dotted line C D, Fig. 4.

To enable those skilled in the art to which my invention belongs to make and use the same, I will proceed to describe it more in detail.

In the drawings, the part marked A represents the cage or case in which the packing is arranged for use.

This cage or case is to be made in any suitable manner for use upon the end of a steam-cylinder or pump-head; but as my invention relates to the parts contained within said cage or case the description will be confined thereto.

B represents a section of a piston or pump rod, which passes through the packing, the parts of which are constructed as follows:

C is a circular plate, having a hole in the center, and fitted into the recess in the cage or case A, and upon said plate C are arranged two packing-rings, D and E, both of which rings are made in sections, the sections of ring D extending from plate C to circular plate F, as indicated in Fig. 4 of the drawings. The inner surface of the sections forming ring D are cut out beveling or concaved from their ends in as far as the packing-rings E and E' extend, but are formed upon a true circle to fit the outer circular form of the central packing-ring G, as indicated in Fig. 6.

The rings E, E', and G are made of soft metal, while their form of construction, in combination with the outer ring D, is such that the latter holds them compactly together and close upon the piston-rod.

It will be understood that all of the packing-rings E, E', and G are made in sections, to permit of an expansion and contraction of the packing without permitting of the passage of steam, since the sections of the packing-rings E and E' lap the joints of packing-ring G, while the circular plate C fits steam-tight against the recessed part *a* of the case or cage A. The joints between the outer edges of the rings E, E', and G are also steam-tight.

As the cage or case is secured to the head of the engine or pump cylinder, the steam enters the holes *b* in the plate H, and passes around the packing by filling the space *c*, thereby keeping the packing up close to the piston-rod, but relaxing the pressure when the exhaust takes place, thereby relieving both the piston-rod and packing from friction consequent upon the pressure of the steam, the only friction left being what is due to the open springs *d d*, which clasp the packing-rings and hold them together by a gentle pressure, the rings being fitted into grooves in the outer surfaces of the sections of the packing-ring D.

The outer ring D could be used with good advantage with two inner rings made in two or more sections.

Those skilled in the art to which my invention belongs will readily appreciate the great practical value of my improvement.

The construction is such that it can be readily applied within the stuffing-box of a steam engine or pump, or otherwise, and those parts which are in anywise liable to require repairs or replacement involve but little expense for such purpose.

Having described my improvement in packing for steam engines and pumps, what I claim therein as new and of my invention, and desire to secure by Letters Patent, is—

1. The outer concave packing-ring, in combination with two or more inner rings held together and in place by the beveled or sloping faces of the concave of the outer ring, substantially as shown and described.

2. The combination of the outer sectional concave packing-ring, two or more inner rings held together and in place by the beveled or sloping faces of the concave of the outer ring, and a clamping spring or springs encircling the outer ring, these elements being arranged for joint operation, as set forth.

JOHN W. HAWKINS.

Witnesses:
DAVID BUNN,
JOHN W. SEAVER.